US005551327A

United States Patent [19]

Hamby et al.

[11] Patent Number: 5,551,327

[45] Date of Patent: Sep. 3, 1996

[54] ADJUSTING MEANS FOR MULTI-BLADE CUTTING APPARATUS

[76] Inventors: William D. Hamby, 541 Legion Rd.; James T. Clark, 125 Timber La., both of Lenoir, N.C. 28645

[21] Appl. No.: 294,601

[22] Filed: Aug. 22, 1994

[51] Int. Cl.$^{6}$ .......... B23D 45/10

[52] U.S. Cl. .......... 83/508.3; 83/425.4; 83/698.61

[58] Field of Search .......... 83/499, 425.4, 83/425.3, 425.2, 665, 698.61, 508.3; 144/376, 377, 378

[56] References Cited

U.S. PATENT DOCUMENTS

| | | | |
|---|---|---|---|
| 1,983,421 | 12/1934 | Wormer . | |
| 2,619,995 | 12/1952 | Gordon | 83/425.4 |
| 3,580,305 | 5/1971 | Wright . | |
| 3,630,244 | 12/1971 | Cromeens et al. | 83/508.2 |
| 3,742,796 | 7/1973 | McMillan . | |
| 3,828,635 | 8/1974 | Smith | 83/425.4 |
| 3,866,502 | 2/1975 | Brewer, Sr. . | |
| 4,077,291 | 3/1978 | Obenshain . | |
| 4,269,097 | 5/1981 | Linn | 83/499 |
| 4,570,518 | 2/1986 | Burmeister et al. . | |
| 4,599,929 | 7/1986 | Dutina | 83/425.4 |
| 4,607,552 | 8/1986 | Siler | 83/499 |
| 4,922,780 | 5/1990 | Hurdle, Jr. . | |
| 4,960,023 | 10/1990 | Reuter et al. . | |
| 4,977,802 | 12/1990 | Kirbach . | |
| 5,036,741 | 8/1991 | Scott | 83/508.2 |

*Primary Examiner*—Rinaldi I. Rada
*Assistant Examiner*—Elizabeth Stanley
*Attorney, Agent, or Firm*—Shefte, Pinckney & Sawyer

[57] ABSTRACT

Multiple saw blades in a gang rip saw apparatus and like multi-blade cutting apparatus may be selectively adjusted to differing spacings from one another by mounting a threaded sleeve on the rotary arbor of the apparatus and mounting a plurality of electric drive motors on the sleeve with the rotor of each drive motor threadedly engaged with the sleeve and the stator held fixed against rotation relative to the sleeve by longitudinal guide rods, which carry electrical supply wiring to the stators from a slip ring assembly. Each saw blade is affixed annularly to a respective one of the stators. Individual energization of each stator causes the respective rotor to drive the motor/blade assembly along the sleeve to a desired position relative to the other saw blade/motor assemblies. With the saw blade/motor assemblies selectively positioned at desired relative spacings, the arbor is driven to rotate the saw blade/drive motor assemblies integrally with the arbor for "gang" cutting operation in conventional manner.

19 Claims, 3 Drawing Sheets

ADJUSTING MEANS FOR MULTI-BLADE CUTTING APPARATUS

BACKGROUND OF THE INVENTION

The present invention relates generally to cutting apparatus of the type having multiple cutting blades supported in spaced relation for making multiple correspondingly spaced parallel cuts and, more particularly, to a novel arrangement for independently adjusting the spacings between the multiple cutting blades in order to selectively make differently spaced cuts in workpieces.

Various forms of cutting apparatus exist in differing industries for making multiple spaced parallel cuts simultaneously in a traveling workpiece utilizing respectively spaced cutting blades. By way of example, one particular form of cutting apparatus utilized in the woodworking industry is typically referred to as a gang rip saw, being equipped with multiple rotary wood-cutting blades commonly mounted on a driven arbor shaft at spacings to one another for "rip" sawing of elongate wood boards and planks lengthwise into multiple boards of smaller respective widths, e.g., into standard as well as non-standard board sizes. Because the usable width of wood boards and planks may vary from board to board and because substantially any possible width of wood boards may be required in a given woodworking application, it is a common necessity that the multiple cutting blades of such a sawing apparatus will need to be adjusted to differing spacings from one another on a regular basis, up to several times over the course of a given work day or work shift. In most conventional gang rip saws, the spacings between saw blades are achieved by mounting one or more spacing elements of given axial dimensions on the arbor shaft of the saw between the adjacent pair of blades to maintain a desired dimensional spacing or spacings between the saws. While this arrangement functions satisfactorily for the intended purpose, the assembly of the saw blades and spacing elements on the arbor can be a time-consuming task, especially when changing the spacing of saw blades in the course of operation of the sawing apparatus. The resulting down time in the operation of the sawing apparatus can thereby reduce its operating efficiency and productivity.

SUMMARY OF THE INVENTION

It is accordingly an object of the present invention to provide a novel arrangement for use in a gang rip saw or other cutting apparatus of the type having multiple spaced cutting blades or other cutting implements supported on a common drive shaft or other drive member to enable simple, easy and rapid adjustment of the spacings between the cutting blades or implements when necessary to make differently spaced cuts in workpieces, without requiring disassembly and reassembly or demounting and re-mounting of the cutting blades or implements to and from the drive.

Briefly summarized, the adjustment arrangement of the present invention basically comprises an elongate support member on which a plurality of electrical drive devices are mounted for lengthwise movement, with each drive device being arranged in operative association with a respective one of the cutting implements to correspondingly move the associated implement along the common drive member. Appropriate means are provided in association with the support member to supply electrical power to each drive device.

In a preferred embodiment of the present invention, the common drive member for the cutting implements is rotatably operated and the support member for the adjusting arrangement is mounted to the rotary drive member. The support member has a longitudinally extending threaded portion and a longitudinally extending guide portion, preferably in the form of multiple spaced parallel guide rods. Each of the electrical drive devices is in the form of an electrical motor having a stator and a rotor arranged for relative rotation, with each drive device being mounted to the support member with its rotor in threaded engagement with the threaded portion of the support member for lengthwise movement rotationally therealong and with the guide rods extending through each stator to fix the stators against rotation relative to the support member. Each cutting blade or implement is affixed to a respective one of the stators for movement therewith in correspondence to movement of the associated rotor along the support member. Electrical power is supplied by independent supply circuits for each drive device extending through one or more of the guide rods for connection to the respective stators. A microprocessor or other controller may be utilized to control actuation and deactuation of each drive device independently and each drive device may be equipped with a sensor for signaling its location along the support member to the controller.

DETAILED DESCRIPTION OF THE PREFERRED EMBODIMENT

Figure 1:
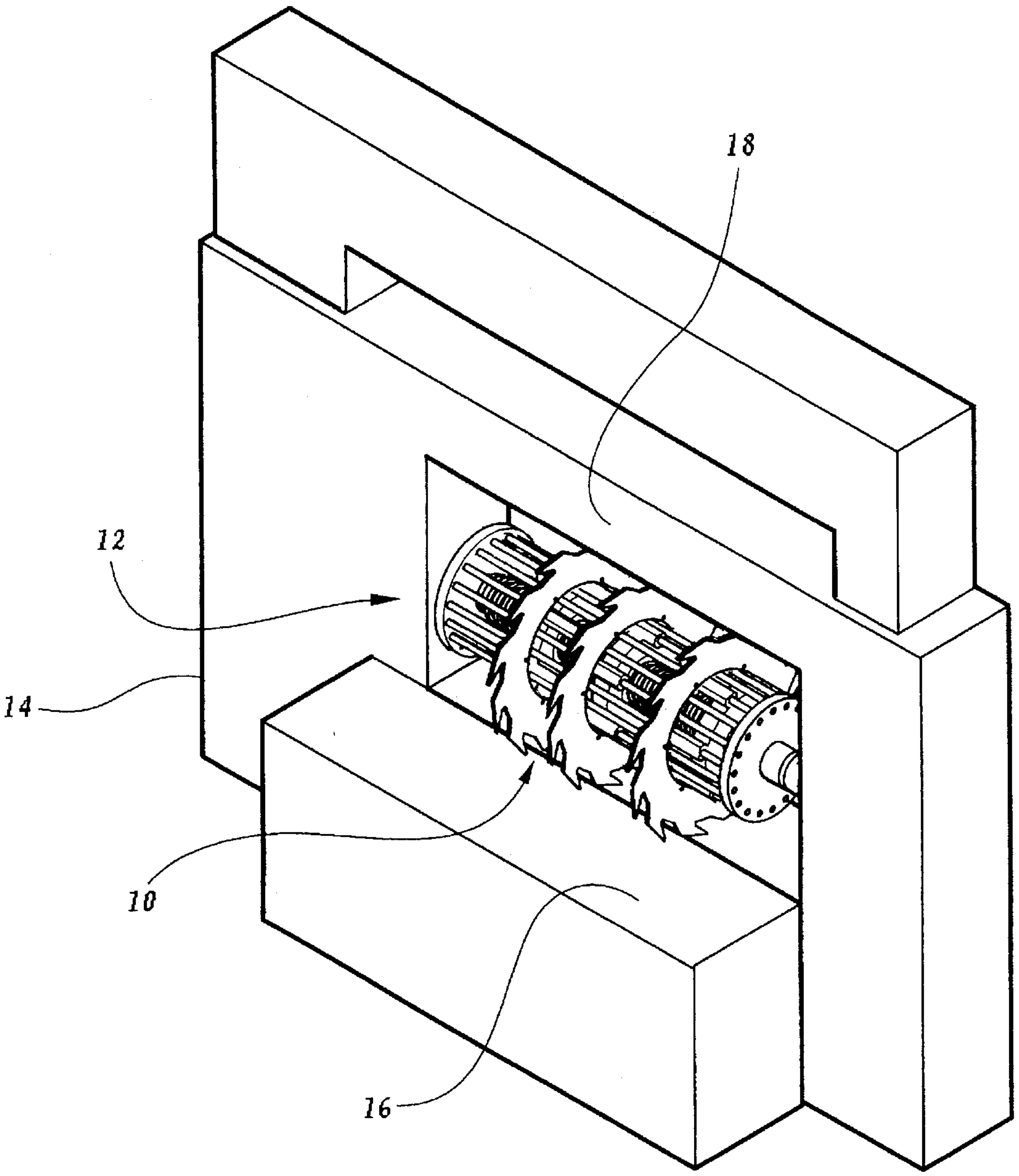
FIG. 1 is a perspective view of a gang rip saw apparatus equipped with a blade adjusting arrangement in accordance with the preferred embodiment of the present invention.

Referring now to the accompanying drawings and initially to FIG. 1, a saw blade adjusting arrangement in accordance with a preferred embodiment of the present invention is indicated generally at 10 as preferably installed on a conventional form of gang rip saw apparatus, generally indicated at 12, of the type commonly in use in the woodworking industry for making multiple parallel "rip" cuts longitudinally in elongate wood boards, planks, timbers, etc. Inasmuch as the basic construction of the gang rip saw apparatus 12 is known, the rip saw apparatus 12 is illustrated and described herein only to the extent necessary to facilitate an understanding of the construction, operation and use of the saw blade adjusting arrangement 10.

Basically, the gang rip saw apparatus 12 has a floor-standing frame 14 supporting a work table 16 and having a superstructure 18 elevated above the work table 16 by which a saw arbor shaft 20 is horizontally supported. Within the main body of the frame 14, a drive motor (not shown) is mounted in driving connection to the inward end of the arbor 20, from which the arbor 20 extends horizontally outwardly directly below the superstructure 18 with the free outward end of the arbor 20 being supported by a bearing 25 mounted to the outward end of the superstructure 18. To the extent thus far described, the construction of the gang rip saw apparatus 12 is essentially conventional.

Figure 2:
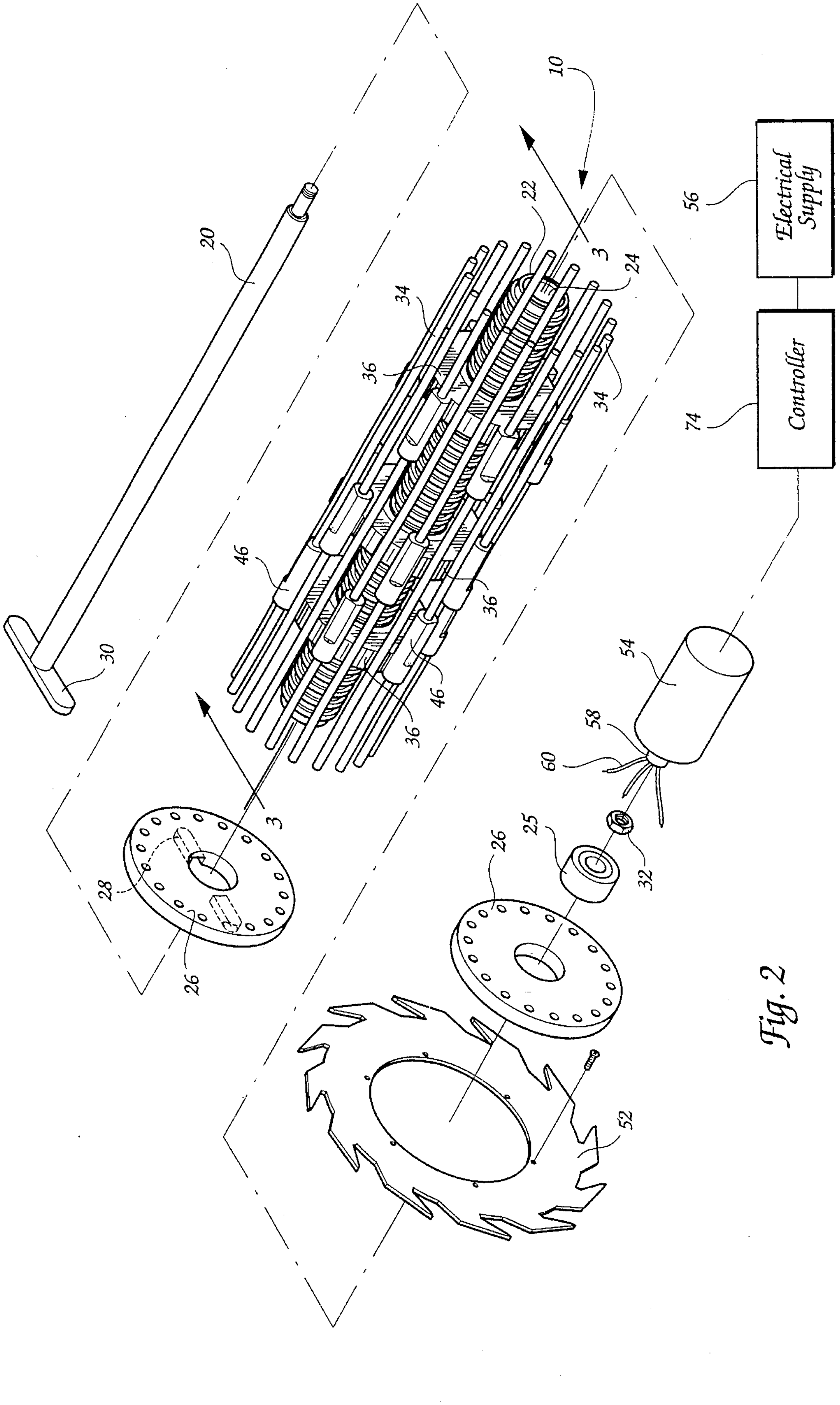
FIG. 2 is an exploded perspective view of the blade adjusting arrangement of FIG. 1.

The saw blade adjusting arrangement 10 is mounted coaxially about the arbor 20 in fixed relation thereto so as to be driven integrally therewith by the aforementioned drive motor. As best seen in FIG. 2, the saw blade adjusting arrangement 10 has a central cylindrical sleeve 22 having an internal axial throughbore 24 by which the sleeve 22 is telescopically mounted coaxially about the arbor 20 to extend along a substantial portion of its length. Circular end flange plates 26 are affixed coaxially to each opposite end of the sleeve 22, the inwardmost end flange plate 26 having a keyway 28 formed in the surface thereof facing the frame 14 to mate with a key 30 on the shank of the arbor 20, thereby to fix the saw blade adjusting arrangement 10 relative to the arbor 20. The outward end of the arbor 20 extends beyond the outward end flange plate 26, through the bearing 25 supported by the frame superstructure 18 and has a lock nut 32 secured to a threaded end portion of the arbor 20. A plurality of guide rods 34 are affixed to and extend between the outer peripheries of the end flange plates 26 in parallel spaced relation to one another at equal circumferential spacings about the flange plates 26.

A plurality of electrical drive motor assemblies 36, each basically having a central annular rotor 38 and a coaxial outer annular stator 40, are mounted annularly about the sleeve 22. The sleeve 22 is formed in its circumferential outer periphery with a continuous helical screw thread 42 and the rotor 38 of each drive motor assembly 36 has an internally threaded drive nut 44 fixed to the inward annulus of the rotor 38 in threaded drive engagement with the screw thread 42 of the sleeve 22. The stator 40 of each drive motor assembly 36 has a plurality of guide fingers 46 fixed at spacings about its periphery, each guide finger 46 defining a throughbore 48 axially parallel to the rotational axis of the drive motor assembly 36 and which slidably receives a respective one of the guide rods 34 for slidably supporting the stator 40 thereon. The guide fingers 46 of each stator 40 are formed with respective radial shoulders 50 aligned with one another, at which a respective annular saw blade 52 is affixed rigidly to the stator 40.

Figure 3:
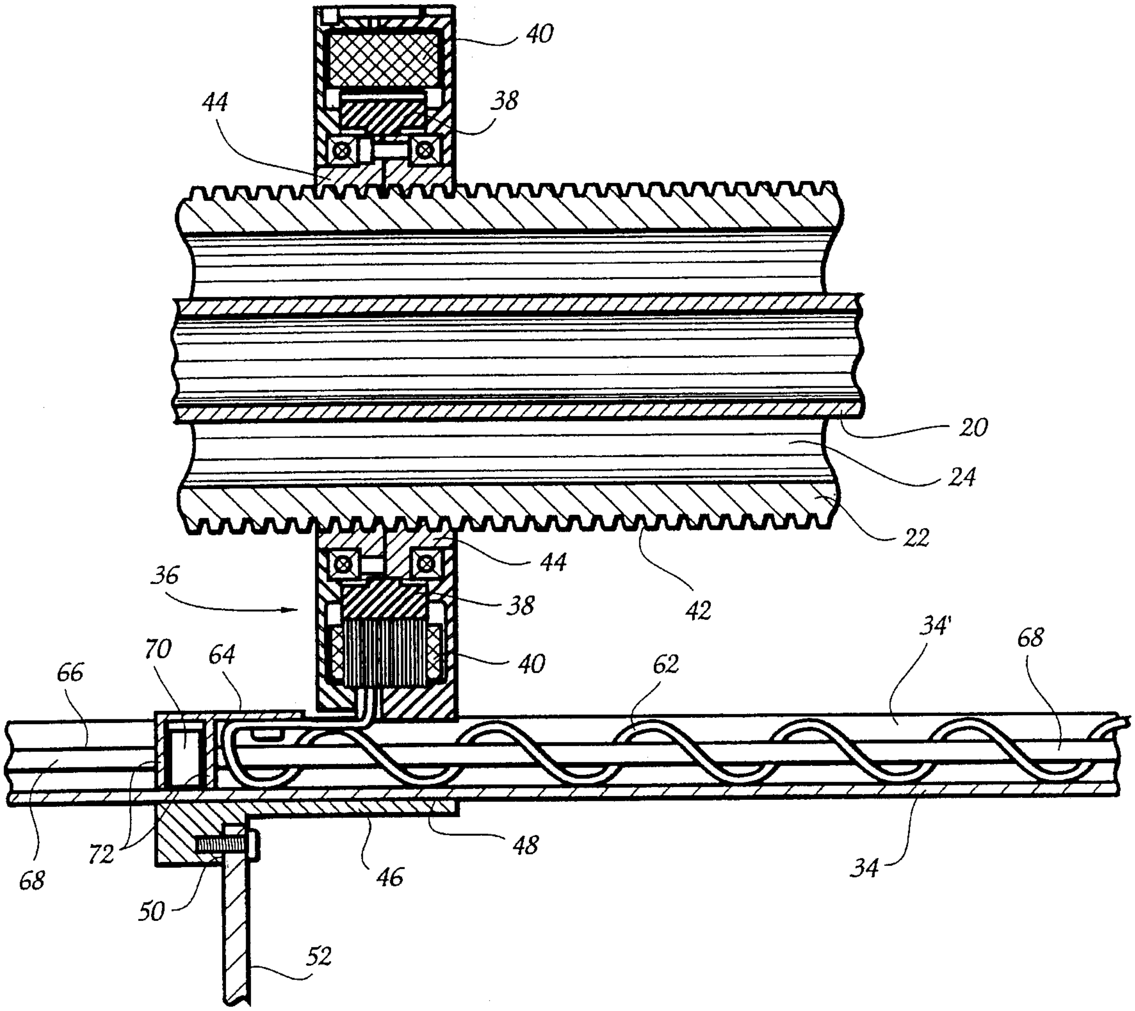
FIG. 3 is an axial cross-sectional view through one of the electrical drive devices of FIG. 2, taken along line 3—3 thereof.

A rotary electrical union assembly of the slip ring type, indicated at 54, is affixed to the bearing 25 at the outward end of the frame superstructure 18 for transmitting operating electrical power independently to the drive motor assemblies 36 from an external source of operating electrical current, indicated only representatively at 56. The exterior housing of the rotary electrical union 54 is fixed relative to the outer housing of the bearing 25 and has a rotational inner core 58 from which a plurality of electrical current leads 60 extend. The core 58 extends through the bearing 25 and is fixed to the outer end flange plate 26 for integral rotation therewith, the electrical leads 60 extending radially outwardly along the outer face of the end flange plate 26 and therefrom into selected ones of the guide rods 34, which are hollow through substantially their entire length with a longitudinal slot 34' opening into the hollow rod interior facing radially inwardly toward the sleeve 22. As best seen in FIG. 3, each electrical lead is connected within each such guide rod 34 to a helical extensible electrical cord 62, the opposite end of which is fixed by a saddle member 64 to a guide finger 46 of a respective stator 40, from which the electrical cord 62 extends outwardly from the guide rod 34 through the slot 34' therein and is electrically connected to the associated stator 40. In this manner, separate electrical leads 60 from the rotary electrical union 54 are independently connected to each stator 40 through differing ones of the hollow guide rods 34.

As also shown in FIG. 3, each hollow guide rod 34 carries an electrical resistor assembly 66 extending lengthwise through the hollow rod interior. Each resistor assembly 66 has a guide shaft 68 extending centrally through the respective guide rod 34 coaxially within the helical electrical cord 62, with an electrical resistor element 70 mounted slidably on the guide shaft 68 and captured between retaining legs 72 of the saddle member 64 to fix the resistor element 70 to slide lengthwise along the guide rods 34 integrally with the associated stator 40. The resistor element 70 is electrically connected to leads (not shown) extending centrally through the guide shaft 68 and outwardly therefrom through the end flange plate 26, whereat the resistor leads are electrically connected to other respective leads from the rotary electrical union 54. The rotary electrical union 54 is connected to a central controller, indicated representatively at 74, preferably in the form of a computer, microprocessor, or other suitable programmable controller, by which electrical power may be independently controlled to each stator 40 and each resistor element 70.

The operation and use of the saw blade adjusting arrangement 10 of the present invention may thus be understood. Through the controller 74, each electric drive motor assembly 36 may be individually energized and de-energized. Upon energization of any individual electric drive motor assembly 36, AC electricity is supplied to the stator 40 via electric cord 62, thereby inducing a rotating magnetic field in the stator windings. This magnetic action in turn causes the permanent magnet rotor to be alternately attracted and repelled thereby causing the rotor 38 and the associated drive nut 44 are caused to rotate as a unit relative to the threaded sleeve 22 while the stator 40 is held against rotation relative to the sleeve 22 by the guide rods 34 and the end plates 26, whereby the rotary motion of the rotor 38 causes the drive motor assembly 36 to travel lengthwise along the mating screw thread 42 of the sleeve 22, the direction of movement depending upon the polarization of the electrical supply to the stator 40. Thus, by independent operation of the several electric drive motor assemblies 36, the drive motor assemblies may be selectively moved lengthwise along the sleeve 22 into substantially any desired spacing relative to one another.

By mounting of the guide fingers 46 for the respective stators 40 on differing guide rods 34, the guide fingers 46 do not interfere with one another, whereby the drive motor assemblies 36 may be moved into abutting disposition with one another. During adjusting movements of the electric drive motor assemblies 36 in the manner described, the respective resistor elements 70 move integrally therewith to signal the central controller 74 precisely as to the relative location of each drive motor assembly 36 along the threaded sleeve 22, thereby enabling fine positional control of each saw blade 52. As will be recognized in FIG. 3, the guide fingers 46 are affixed to their respective stators 40 to project axially therefrom to differing extents, whereby the respective saw blades 52 affixed to the stators 40 will also move into abutting relationship with one another when the drive motor assemblies 36 are located abuttingly so that the saw blades collectively will define a wider kerf in cutting operation.

Once each of the drive motor assemblies 36 are selectively moved to dispose their respective saw blades 52 at desired spacings to one another, the gang rip saw apparatus 12 may be operated in its conventional manner by driving the arbor 20 to rotate the arbor and the saw blade adjusting arrangement 10 as an integral unit for normal gang rip sawing operation of the respective saw blades 52. With the electric drive motor assemblies 36 de-energized, the respective rotors and stators 38,40 remain fixed to one another to hold the drive motor assemblies fixed on the threaded sleeve 22.

As those persons skilled in the art will readily recognize, the saw blade adjusting arrangement 10 of the present invention advantageously is of a relatively simple construction and reliable operation. Advantageously, the present invention enables multiple saw blades in a gang rip saw apparatus 12 to be quickly and easily adjusted to any of a variety of differing spacings and dispositions, including being positioned in face abutment with one another, without disassembly or demounting of the saw blades or any other portion of the apparatus, merely by initiating electronic commands from the controller 74. The down time, loss of production and inefficiency suffered by the requirement of manual reassembly of the arbor of a conventional gang rip saw apparatus is completely alleviated, thereby enabling a woodworking operation to realize significantly increased production and reduced operating costs over time.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In a cutting apparatus having multiple cutting implements supported at spacings from one another on a common drive member for making multiple correspondingly spaced parallel cuts in a workpiece, means for selectively adjusting the spacings between the cutting implements for selectively making differently spaced cuts in workpieces, the adjusting means comprising an elongate support member, a plurality of electrical drive devices, each drive device being mounted to the support member for lengthwise movements along the support member and being arranged in operative association with a respective one of the cutting implements to correspondingly move the associated cutting implement along the common drive member, and means associated with the support member for supplying electrical power to each drive device.

2. A cutting apparatus according to claim 1, wherein the support member is mounted to the common drive member.

3. A cutting apparatus according to claim 1, wherein each cutting implement is mounted to a respective one of the drive devices for movement therewith along the support member.

4. In a cutting apparatus having multiple cutting implements supported at spacings from one another on a common drive member for making multiple correspondingly spaced cuts in a workpiece, means for selectively adjusting the spacings between the cutting implements for selectively making differently spaced cuts in workpieces, the adjusting means comprising an elongate support member, a plurality of electrical drive devices each having a stator and a rotor arranged for relative rotation, each drive device being mounted to the support member with its rotor arranged for lengthwise movement rotationally along the support member and its stator fixed against rotation relative to the support member, each drive device being arranged in operative association with a respective one of the cutting implements to correspondingly move the associated cutting implement along the common drive member, and means associated with the support member for supplying electrical power therealong independently to the stator of each drive device.

5. A cutting apparatus according to claim 4, wherein the support member is mounted to the common drive member.

6. A cutting apparatus according to claim 4, wherein each cutting implement is mounted to a respective one of the drive devices for movement therewith along the support member.

7. A cutting apparatus according to claim 4, wherein the support member includes a longitudinally extending threaded portion and a longitudinally extending guide portion, each drive device having its rotor mounted in threaded engagement with the threaded portion of the support member and its stator mounted in sliding engagement with the guide portion of the support member.

8. A cutting apparatus according to claim 7, wherein the electrical power supplying means extends along the guide portion of the support member.

9. A cutting apparatus according to claim 8, wherein the electrical power supplying means includes an independent supply circuit for each drive device.

10. A cutting apparatus according to claim 4, wherein each drive device includes a sensor for indicating its location along the support member.

11. In a cutting apparatus having multiple cutting implements supported at spacings from one another on a common drive member for making multiple correspondingly spaced cuts in a workpiece, means for selectively adjusting the spacings between the cutting implements for selectively making differently spaced cuts in workpieces, the adjusting means comprising an elongate support member, a plurality of drive devices each having a stator and a rotor arranged for relative rotation, each drive device being mounted to the support member with its rotor arranged for lengthwise movement rotationally along the support member and its stator fixed against rotation relative to the support member, each drive device being arranged in operative association with a respective one of the cutting implements to correspondingly move the associated cutting implement along the common drive member.

12. A cutting apparatus according to claim 11, wherein the support member is mounted to the common drive member.

13. A cutting apparatus according to claim 11, wherein each cutting implement is mounted to a respective one of the drive devices for movement therewith along the support member.

14. A cutting apparatus according to claim 11, wherein the support member includes a longitudinally extending threaded portion and a longitudinally extending guide portion, each drive device having its rotor mounted in threaded engagement with the threaded portion of the support member and its stator mounted in sliding engagement with the guide portion of the support member.

15. In a cutting apparatus having multiple cutting blades supported at spacings from one another on a common rotary drive member for making correspondingly spaced cuts in a workpiece, means for selectively adjusting the spacings between the cutting blades for selectively making differently spaced cuts in workpieces, the adjusting means comprising an elongate support member mounted to the rotary drive member, the support member having a longitudinally extending threaded portion, a plurality of electrical drive devices each having a stator and a rotor arranged for relative rotation, each drive device being mounted to the support member with its rotor in threaded engagement with the threaded portion of the support members for lengthwise movement rotationally therealong and its stator fixed against rotation relative to the support member, each cutting blade being affixed to a respective one of the stators for movement therewith in correspondence to movement of the associated rotor along the support member, and means associated with the support member for supplying electrical power therealong independently to the stator of each drive device.

16. A cutting apparatus according to claim 15, wherein each support member includes a longitudinally extending guide portion, each drive device having its stator mounted in sliding engagement with the guide portion of the support member.

17. A cutting apparatus according to claim 16, wherein the electrical power supplying means extends along the guide portion of the support member.

18. A cutting apparatus according to claim 17, wherein the guide portion of the support member comprises a plurality of guide rods extending in spaced parallel relation through each stator, the electrical power supplying means including an independent supply circuit for each drive device extending respectively through at least one of the guide rods.

19. A cutting apparatus according to claim 15, wherein each drive device includes a sensor for indicating its location along the support member.

* * * * *